United States Patent
Choi

(10) Patent No.: US 8,346,298 B2
(45) Date of Patent: Jan. 1, 2013

(54) MOBILE TERMINAL AND PROCESS CONTROL METHOD THEREOF

(75) Inventor: Mun-Seok Choi, Seoul (KR)

(73) Assignee: LG Electronics Inc., Seoul (KR)

(*) Notice: Subject to any disclaimer, the term of this patent is extended or adjusted under 35 U.S.C. 154(b) by 409 days.

(21) Appl. No.: 12/766,803

(22) Filed: Apr. 23, 2010

(65) Prior Publication Data

US 2010/0298024 A1 Nov. 25, 2010

(30) Foreign Application Priority Data

May 19, 2009 (KR) .......................... 10-2009-0043677

(51) Int. Cl.
*H04W 88/02* (2009.01)
(52) U.S. Cl. ...................................... 455/550.1; 370/350
(58) Field of Classification Search ............... 455/550.1, 455/566, 418, 419, 420, 414.1, 456.1; 370/350, 370/328, 329, 341; 713/375, 400
See application file for complete search history.

(56) References Cited

U.S. PATENT DOCUMENTS

| | | | |
|---|---|---|---|
| 6,442,407 B1 | 8/2002 | Bauer et al. | |
| 8,121,635 B1 * | 2/2012 | Fujisaki | ...................... 455/550.1 |
| 8,150,459 B2 * | 4/2012 | Saito | ........................... 455/556.2 |
| 2004/0142725 A1 | 7/2004 | Kim | |
| 2005/0181789 A1 * | 8/2005 | Yach et al. | ...................... 455/433 |
| 2009/0063886 A1 * | 3/2009 | Arimilli et al. | ................ 713/400 |
| 2009/0249127 A1 * | 10/2009 | Deleris | ............................ 714/45 |
| 2009/0325630 A1 * | 12/2009 | Tiitola et al. | ................ 455/550.1 |
| 2010/0153346 A1 * | 6/2010 | Thode | ............................ 707/690 |
| 2010/0195840 A1 * | 8/2010 | Ciccone | ............................ 381/61 |
| 2010/0296516 A1 * | 11/2010 | Ramaiah et al. | ............... 370/401 |
| 2011/0093948 A1 * | 4/2011 | Rasmussen et al. | ............ 726/17 |
| 2011/0151837 A1 * | 6/2011 | Winbush, III | ............... 455/412.1 |
| 2012/0030366 A1 * | 2/2012 | Collart et al. | ................. 709/229 |

FOREIGN PATENT DOCUMENTS

CN 1582033 2/2005

* cited by examiner

*Primary Examiner* — Kamran Afshar
*Assistant Examiner* — Khawar Iqbal
(74) *Attorney, Agent, or Firm* — Lee, Hong, Degerman, Kang & Waimey

(57) ABSTRACT

A mobile terminal includes a first controller controlling an overall operation of the mobile terminal, a memory storing data including first data, an interface connecting with an external terminal, a second controller performing synchronization between the first data previously stored in the memory and second data stored in the external terminal in response to a synchronization request received from the external terminal, and a wireless communication unit configured to receive a call signal. The second controller performs the synchronization as a background process and the first controller processes the call signal upon receiving the call signal while the synchronization is performed as the background process.

27 Claims, 7 Drawing Sheets

MOBILE TERMINAL AND PROCESS CONTROL METHOD THEREOF

CROSS REFERENCE TO RELATED APPLICATIONS

Pursuant to 35 U.S.C. §119(a), this application claims the benefit of earlier filing date and right of priority to Korean Application No. 10-2009-0043677, filed on May 19, 2009, the contents of which is incorporated by reference herein in its entirety.

FIELD OF THE INVENTION

The present invention relates to a mobile terminal comprising a plurality of processors and a method of processing a preparatory operation for a particular function as a background process in the mobile terminal using at least one of the plurality of processors.

DESCRIPTION OF THE RELATED ART

A mobile terminal may be configured to perform various functions such as data and voice communications, capturing images and video via a camera, recording audio, playing music files via a speaker system, and displaying images and video on a display. Some terminals include additional functionality such as execution of games or multimedia. More recently, some mobile terminals are configured to receive broadcast and multicast signals which permit viewing of content such as videos and television programs.

Terminals can be classified into a mobile terminal and a stationary terminal based on their mobility. Furthermore, the mobile terminal can be further classified into two types, such as a handheld terminal and a vehicle mounted terminal, based on a mode of carriage by a user.

Efforts are ongoing to support and increase the functionality of mobile terminals. Such efforts include software and hardware improvements, as well as changes and improvements in the structural components which form the mobile terminal.

In general, there is a delay when some applications are initiated in a mobile terminal because a preparatory process, such as loading media contents data stored in a memory to create a list, is required when an application, such as a multimedia player function, is used. Thus, such an application or function cannot be used immediately in the mobile terminal while the preparatory process is performed. In order to solve the above identified problem of a delayed process for a particular function, there have been continued efforts to reduce the time required for building data necessary for execution of the particular function.

SUMMARY OF THE INVENTION

According to an embodiment of the present invention, a method of controlling processing in a mobile terminal including a plurality of controllers includes connecting with an external terminal, synchronizing data stored in the external terminal with data previously stored within the mobile terminal in response to a synchronization request received from the external terminal, wherein the synchronization is performed by a second controller of the mobile terminal, the second controller notifying a first controller of the mobile terminal about the synchronization performed, continuing, by the second controller, the synchronization when a call signal is received during the synchronization, and processing, by the first controller, the received call signal while the synchronization is processed by the second controller as a background process.

According to another embodiment of the present invention, a mobile terminal includes a first controller controlling an overall operation of the mobile terminal, a memory storing data including first data, an interface connecting with an external terminal, a second controller performing synchronization between the first data previously stored in the memory and second data stored in the external terminal in response to a synchronization request received from the external terminal, and a wireless communication unit receiving a call signal. In the mobile terminal, the second controller performs the synchronization as a background process and the first controller processes the call signal upon receiving the call signal while the synchronization is performed as the background process.

According to yet another embodiment of the present invention, a method of controlling processing in a mobile terminal including a plurality of controllers includes processing a database (DB) build with data stored in a storage medium for a particular application to be performed in the mobile terminal, receiving a call signal while the DB build is processed, continuing processing of the DB build as a background process upon receiving the call signal, and processing the received call signal while the DB build is processed as the background process.

According to yet another embodiment of the present invention, a mobile terminal includes a first controller controlling an overall operation of the mobile terminal, a second controller processing first data used in a particular application under a control of the first controller, the second controller processing a database (DB) build used for the particular application, a memory storing data including the first data, and a wireless communication unit receiving a call signal. In the mobile terminal, the second controller continues the processing of the DB build with the first data stored in the memory as a background process and the first controller processes the call signal upon receiving the call signal while the DB build is processed as the background process.

BRIEF DESCRIPTION OF THE DRAWINGS

The above and other aspects, features, and advantages of the present invention will become more apparent upon consideration of the following description of preferred embodiments, taken in conjunction with the accompanying drawings.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Hereinafter, a mobile terminal of the present disclosure will be described in more detail with reference to the accompanying drawings. A suffix "module" or "unit" used for constituent elements disclosed in the following description is merely intended for easy description of the specification, and the suffix itself does not give any special meaning or function. Therefore, it should be noted that the suffix "module" or "unit" may be interchangeably used for each other.

A terminal may be implemented in various forms. For example, a terminal disclosed herein may include a mobile terminal such as a portable phone, a smart phone, a laptop computer, a digital broadcast terminal, a personal digital assistant (PDA), a portable multimedia player (PMP), a navigation system, and the like as well as a stationary terminal such as a digital TV, a desktop computer, and the like. In the following description, it is assumed that the terminal is a mobile terminal. However, it would be easily understood by those skilled in the art that a configuration according to the embodiments disclosed herein may be applicable to the stationary terminal such as the digital TV, desktop computer, and the like if constituent elements particularly configured for the mobile terminal are excluded.

Figure 1:
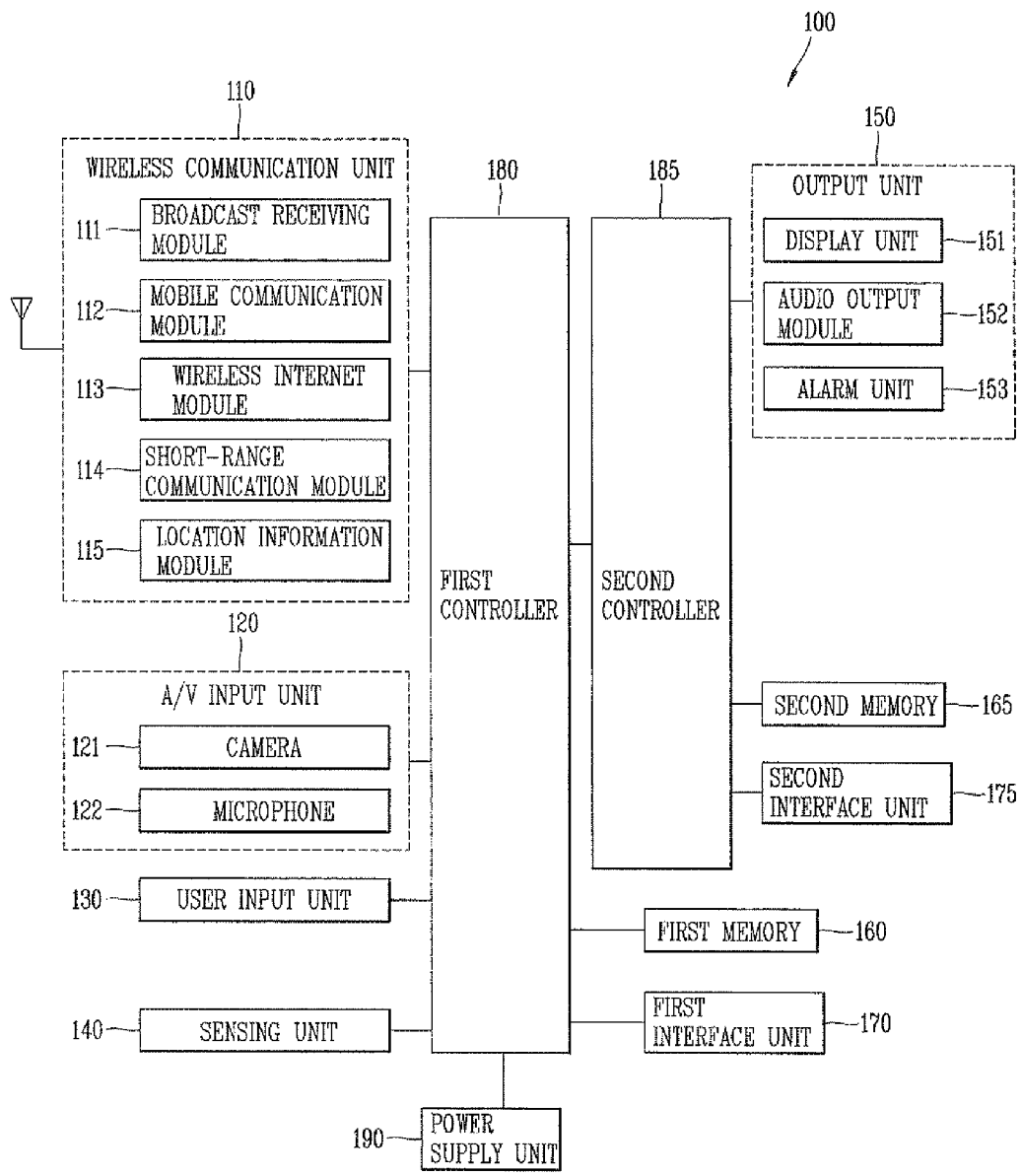
FIG. 1 is a block diagram illustrating a mobile terminal according to an embodiment of the present invention.

Referring to FIG. 1, a mobile terminal 100 may include a wireless communication unit 110, an Audio/Video (NV) input unit 120, a user input unit 130, a sensing unit 140, an output unit 150, a first memory 160 and a second memory 165, a first interface unit 170 and a second interface unit 175, a first controller 180 and a second controller 185, and a power supply unit 190. However, the constituent elements as illustrated in FIG. 1 are not necessarily required, and the mobile terminal 100 may be implemented with a greater or lesser number of elements than those illustrated elements.

The wireless communication unit 110 typically includes one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server through a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits to the mobile terminal 100.

The broadcast associated information may be information regarding a broadcast channel, a broadcast program, a broadcast service provider, and the like. The broadcast associated information may also be provided through a mobile communication network, and in this case, the broadcast associated information may be received by the mobile communication module 112.

The broadcast signal may include a TV broadcast signal, a radio broadcast signal and a data broadcast signal as well as a broadcast signal in a form that a data broadcast signal is combined with the TV or radio broadcast signal. The broadcast signal may exist in various forms. For example, it may exist in the form of an electronic program guide (EPG) of a digital multimedia broadcasting (DMB) system, electronic service guide (ESG) of a digital video broadcast-handheld (DVB-H) system, and the like.

The broadcast receiving module 111 may receive a broadcast signal using various types of broadcast systems. In particular, the broadcast receiving module 111 may receive a digital broadcast signal using a digital broadcast system such as a digital multimedia broadcasting-terrestrial (DMB-T) system, digital multimedia broadcasting-satellite (DMB-S) system, media forward link only (MediaFLO) system, digital video broadcast-handheld (DVB-H) system, integrated services digital broadcast-terrestrial (ISDB-T) system, and the like. The broadcast receiving module 111 is configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal and/or various types of data according to text and/or multimedia message transmission and/or reception.

The wireless Internet module 113 supports wireless Internet access. The wireless Internet module 113 may be built-in or externally installed to the mobile terminal 100. A wireless Internet access technique used by the wireless Internet module 113 may include a WLAN (Wireless LAN), Wi-Fi, Wibro (Wireless Broadband), Wimax (World Interoperability for Microwave Access), HSDPA (High Speed Downlink Packet Access), or the like.

The short-range communication module 114 supports a short-range communication. A short-range communication technology used by the short-range communication module 114 may include BLUETOOTH, Radio Frequency IDentification (RFID), Infrared Data Association (IrDA), Ultra WideBand (UWB), ZIGBEE, or the like.

The location information module 115 checks or acquires a location of the mobile terminal 100, and for example, the location information module 115 may be a Global Positioning System (GPS) module. According to current technologies, the GPS module calculates spaced-apart distance information and accurate time information from three or more satellites and then applies trigonometry to the calculated information, thereby accurately calculating current position information based on latitude, longitude, and height. At present, there is widely used a method of calculating position and time information using three satellites and correcting an error of the calculated position and time information using another satellite. Furthermore, the GPS module can calculate speed information by continuously calculating a current position in real time.

The A/V input unit 120 receives an audio or video signal and may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal 100.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the mobile terminal 100. The user input unit 130 may be configured by including a keypad, a dome switch, a pressure or capacitance-type touch pad, a jog wheel, a jog switch, and the like. In particular, when the touch pad forms an interlayer structure together with a display unit 151 which will be described later, it may be called a touch screen.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 senses whether power is supplied from the power supply unit 190, or whether an external device is coupled to the interface unit 170. For example, the sensing unit 140 can sense the attachment or detachment of an external memory such as a memory card.

The first and second interface units 170, 175 interface with external devices connected to the mobile terminal 100. The first and second interface units 170, 175 may include, for example, wired/wireless headset ports, external charger ports, wired/wireless data ports, memory card ports, ports for coupling devices having an identification module, audio Input/Output (I/O) ports, video I/O ports, earphone ports, or the like.

Here, the identification module may be configured as a chip for storing various information required to authenticate an authority for using the mobile terminal 100, which may include a User Identity Module (UIM), a Subscriber Identity Module (SIM), and the like. Also, the device provided with the identification module (hereinafter, referred to as 'identification device') may be implemented as a smart card. Hence, the identification device can be coupled to the mobile terminal 100 via a port. The first and second interface units 170, 175 may receive data or power from an external device and transfer the received data or power to each constituent element in the mobile terminal 100, or transmit data within the mobile terminal 100 to the external device.

Further, the interface units 170, 175 may serve as a path for power to be supplied from an external cradle to the mobile terminal 100 when the mobile terminal 100 is connected to the external cradle, or as a path for transferring various command signals inputted from the cradle by the user to the mobile terminal 100. Such various command signals or power inputted from the cradle may be operated as signals for recognizing that the mobile terminal 100 has accurately been mounted on the cradle.

The output unit 150 is configured to provide an output for audio signal, video signal, or alarm signal, and the output unit 150 may include the display unit 151, an audio output module 152, and an alarm unit 153.

The display unit 151 may output information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

On the other hand, as described above, in case where the display unit 151 and the touch pad form an interlayer structure to constitute a touch screen, the display unit 151 may be used as an input device as well as an output device. The display unit 151 may include at least one of a Liquid Crystal Display (LCD), a Thin Film Transistor-LCD (TFT-LCD), an Organic Light Emitting Diode (OLED) display, a flexible display, or a three-dimensional (3D) display. Some of those displays may be configured with a transparent type to allow viewing of the exterior through the display unit 151, which may be called transparent displays. An example of the typical transparent displays may include a transparent LCD (TOLED). The display unit 151 may be implemented in two or more in number according to a configured aspect of the mobile terminal 100. For example, an external display unit (not shown) and an internal display unit (not shown) may be simultaneously provided on the mobile terminal 100. The touch screen may be configured to detect a touch input pressure as well as a touch input position and area.

The audio output module 152 may output audio data received from the wireless communication unit 110 or stored in the memory 160, in a call-receiving mode, a call-placing mode, a recording mode, a voice recognition mode, or a broadcast reception mode. The audio output module 152 may output audio signals relating to functions performed in the mobile terminal 100, such as sound alarming a call received or a message received, and the like. The audio output module 152 may include a receiver, a speaker, a buzzer, and the like.

The alarm unit 153 outputs signals notifying the occurrence of events on the mobile terminal 100. The events occurring from the mobile terminal 100 may include a call received, message received, key signal input, touch input, and the like. The alarm unit 153 may output not only video or audio signals, but also other types of signals such as signals notifying the occurrence of events in a vibration manner. When a call signal or message is received, the alarm unit 153 may output a vibration to notify the call signal or message. Otherwise, when a key signal is inputted, the alarm unit 153 may output a vibration as feedback to the inputted key signal. Through the foregoing vibration output, the user can recognize an event occurrence. The signal for notifying an event occurrence may be also outputted through the display unit 151 or the audio output module 152.

The first memory 160 may store a program for processing and controlling the first controller 180 and/or the second controller 185. Alternatively, the first memory 160 may temporarily store input/output data such as phonebook data, messages, still images, video and the like. Further, the first memory 160 may store data related to various patterns of vibrations and audio output in response to a touch input on the touch screen.

The second memory 165 may store multimedia contents such as a picture, music, video, still image, and the like. For example, database (hereinafter, DB) information established for the multimedia contents stored in the second memory 165 may be stored in the first memory 160. The DB information is metadata for multimedia contents management stored in the second memory 165, and may include storage location and description of contents, information of a writer, right condition, use condition, use history, and the like. The metadata may also be used as index information for fast searching specific desired data or information in addition to representing data. In other words, the DB information is a catalogue of available media files.

The first and second memories 160, 165 may be implemented using any type of suitable storage medium including a flash memory type, a hard disk type, a multimedia card micro type, a memory card type, such as SD or DX memory, Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may manage a web storage which performs a storage function of the first and second memories 160, 165 on the Internet.

The first controller 180 typically controls an overall operation of the mobile terminal 100. For example, the first controller 180 performs control and processing associated with telephony calls, data communications, video calls, and the like. Furthermore, the first controller 180 may also perform pattern recognition processing so as to recognize handwriting or drawing input performed on the touch screen as text or image.

The second controller 185 performs processing of multimedia contents such as music, image, video, and the like. Furthermore, the second controller 185 may be implemented within the first controller 180. The second controller 185 may be operated as a background controller under the control of the first controller 180.

If a particular event or interrupt occurs, then the first controller 180 checks whether the second controller 185 is in an idle state. In case where a data build is required by the particular event, the first controller 180 checks whether the second controller 185 is in an idle state. If the second controller 185 is in an idle state, then the first controller 180 allows the second controller 185 to perform a data build as a background process. The particular event may include booting, attachment or detachment of a storage medium, synchronization of media transfer protocol (MTP), over-the-air (OTA) download, and movement or deletion of data. If a particular interrupt, such as receiving a call signal, is generated while the data build is processed in the background by the second controller 185, then the first controller 180 processes the generated interrupt.

Furthermore, if an interrupt is generated while synchronization with an external device is being progressed by the second controller 185, then the first controller 180 controls the second controller 185 such that that the synchronization by the second controller 185 is continued in the background, the first controller 180 processing the generated interrupt.

The power supply unit 190 provides power required by various components under the control of the first and/or second controller 180, 185. The provided power may be internal power, external power, or a combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the first and/or second controller 180, 185.

For software implementation, the embodiments such as procedures and functions may be implemented together with separate software modules each of which performs at least one of functions and operations. Software codes can be implemented with a software application written in any suitable programming language. Also, the software codes may be stored in the first memory 160 and executed by the first controller 180.

Figure 2:
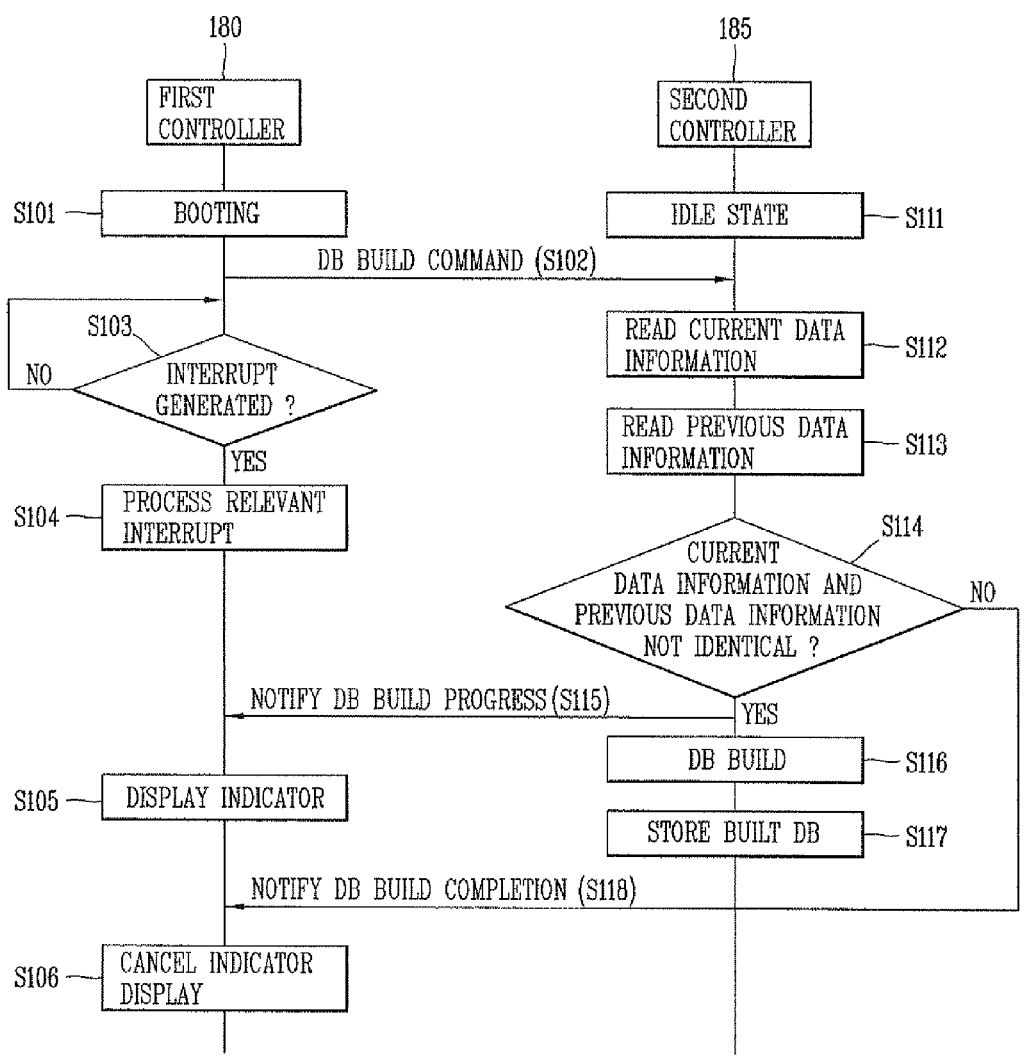
FIG. 2 is a flowchart illustrating a method of controlling a mobile terminal according to an embodiment of the present invention.

Referring to FIG. 2, a process control method in a mobile terminal 100 according to an embodiment of the present invention is described. According to this embodiment, a DB build is performed by the second controller 185 on data stored in a storage medium after booting by the first controller 180.

The first controller 180 performs a booting operation in response to an input (S101). In response to the input, for example, when a user presses a power button or the user input unit 130, the first controller 180 controls the power supply unit 190 to supply power to each component of the mobile terminal 100. Then, the first controller 180 performs the booting operation while the second controller 185 is in an idle state (S111).

Upon completion of the booting operation, the first controller 180 transmits a DB build command to the second controller 185 (S102). Further, the first controller 180 checks whether the second controller 185 is in an idle state, and then requests a DB build to the second controller 185 after determining that the second controller 185 is in the idle status. In other words, the first controller 180 transmits a control command to the second controller 185 in the idle state to perform a preparatory operation in advance, thereby allowing reduction of access time upon initiation of a function or application that requires the preparatory operation such as DB loading. The first controller 180 instructs the second controller 185 to process the preparatory operation in the background when transmitting the control command to the second controller 185. Accordingly, the second controller 185 processes the preparatory operation in response to the control command received from the first controller 180.

The second controller 185 reads multimedia contents or data, such as catalogue of media files, currently stored in the second memory 165 in response to the control command from the first controller 180 (S112). In particular, the second controller 185 enumerates multimedia content items stored in the second memory 165 and reads data previously stored in the first or second memory 160 or 165 (S113). For example, the second controller 185 requests the first controller 180 for DB information previously built for multimedia contents stored in the first memory 160. In response to the request from the second controller 185, the first controller 180 transmits the previous DB information stored in the first memory 160 to the second controller 185.

Alternatively, when the previous DB information is stored in the second memory 165, the second controller 185 reads the previous DB information directly from the second memory 165 without sending a request to the first controller 180. The second controller 185 compares the received previous DB information with current data information (S114). In other words, the second controller 185 checks whether a list of media files currently stored in the second memory 165 is identical to a list of media files previously stored in the second memory 165.

Upon completion of the comparison between the list of the currently stored media files and the list of the previously stored media files, if it is determined that the previous DB information is not identical to the current data information, then the second controller 185 notifies the first controller 180 indicating that a DB build is to be performed (S115). Upon receiving a DB build progress notification from the second controller 185, the first controller 180 displays an indicator indicating that the DB build is being performed in the background (S105).

Then, the second controller 185 performs the DB build and generates DB information for multimedia contents stored in the second memory 165 (S116). In other words, the second controller 185 generates a catalogue of media files currently stored in the second memory 165.

When the DB information generation is completed, the second controller 185 stores it in the first memory 160 via the first controller 180 (S117). The second controller 185 transmits the built DB information to the first controller 180, and the first controller 180 stores the DB information in the first memory 160. When the DB build is completed, the second controller 185 notifies the first controller 180 indicating that the DB build has been completed (S118). Upon receiving a signal notifying the DB build completion from the second controller 185, the first controller 180 stops displaying the indicator on the display unit 151 (S106).

In one aspect of the present invention, if an interrupt is generated while the second controller 185 performs a background process (S112 through S117), then the first controller 180 processes the generated interrupt (S103, S104). For example, the interrupt may be a call, a short message system (SMS), a multimedia message system (MMS), an enhanced messaging service (EMS), or an instant message which does not require utilization of the multimedia contents. In the foregoing embodiment, while the database build is performed for multimedia contents stored in the second memory 165, alternatively, the database build may be performed for multimedia contents stored in the first memory 160 or in both the first and the second memories 160, 165.

Figure 3:
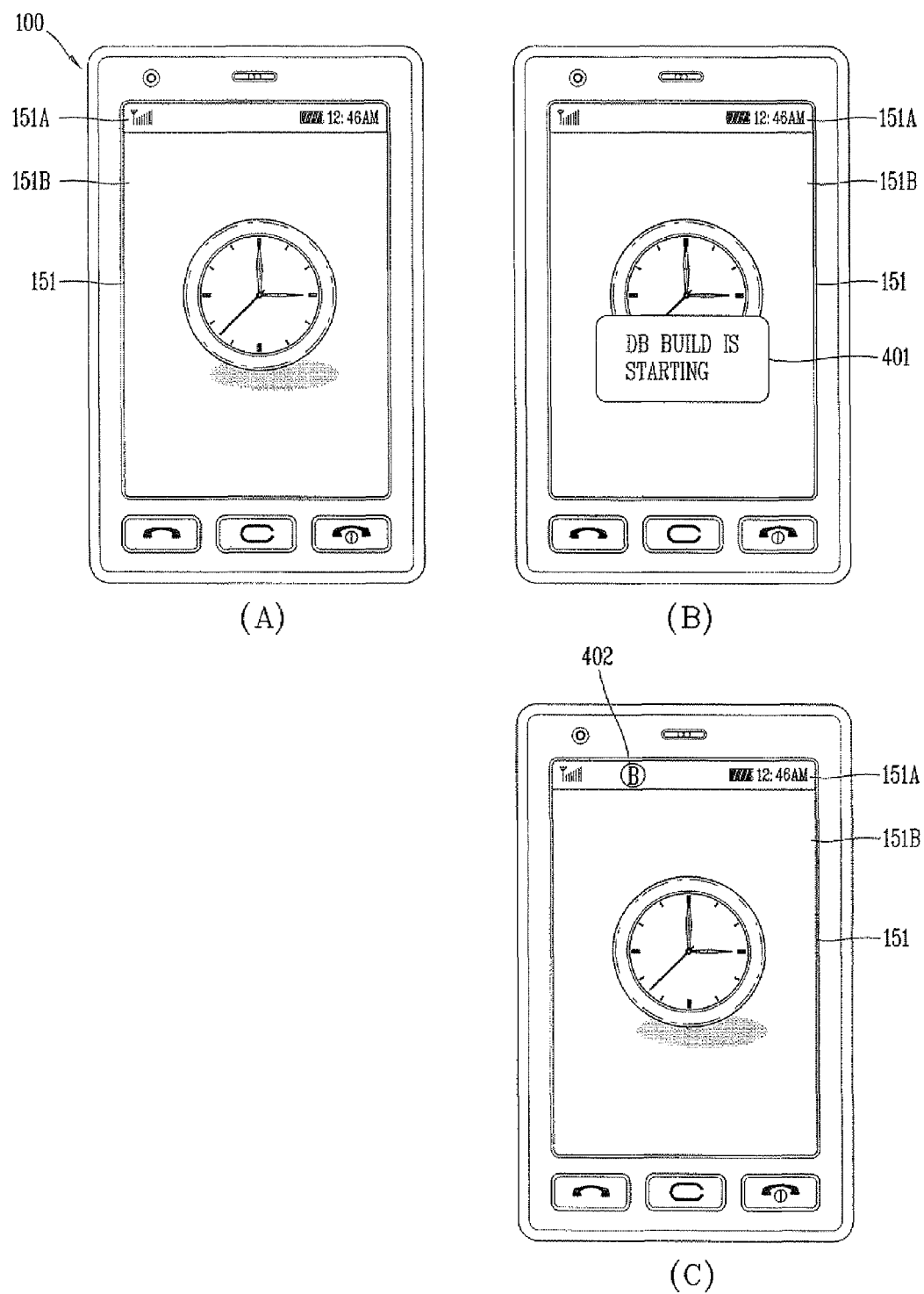
FIGS. 3(A)-3(C) show a display screen of a mobile terminal according to an embodiment of the present invention on which a background process is indicated.

Referring to FIGS. 3(A)-3(C), an exemplary process control screen on a mobile terminal 100 according to an embodiment of the present invention is described. When a booting operation is completed by the mobile terminal 100, the first controller 180 displays a standby screen on the display unit 151 as shown in FIG. 3A. The screen on the display unit 151 may be divided into a status display region 151A displaying the status of the mobile terminal 100 and an information display region 151B displaying data generated by an operation of the mobile terminal 100. An indicator indicating signal strength, message reception, alarm setting, external memory mounting, battery remaining amount, and the like may be displayed on the status display region 151A.

After completion of the booting, the first controller 180 checks whether the second controller 185 is in an idle state. If the second controller 185 is in an idle state, then the first controller 180 instructs the second controller 185 to perform a DB build or DB information generation for media files stored in the second memory 165 in the background. The second controller 185 processes the DB build related to the multimedia contents stored in the second memory 165 in the background under the control of the first controller 180. At this time, the first controller 180 may display a message 401 notifying that the DB build is starting in a pop-up form on the information display region 151B as shown in FIG. 3B. Then, after a predetermined period of time, for example, 1-2 seconds, the message 401 disappears from the information display region 151B, and the first controller 180 displays an indicator 402, indicating that the DB build is being performed in the background, on the status display region 151A as shown in FIG. 3C.

When a particular input is received from the user while the DB build is being performed by the second controller 185 as a background process, the first controller 180 recognizes the user input as a DB build suspend command, thereby suspending the DB build performed by the second controller 185. For example, if an "OK" key and a power-on key are simultaneously or sequentially input by the user, then the first controller 180 may recognize the input as a DB build suspend command, thereby controlling the second controller 185 to suspend the DB build.

While the second controller 185 performing a DB build for the multimedia contents stored in the second memory 165 has been described in the foregoing embodiment, an authority for accessing the first memory 160 may be given to the second controller 185 such that the second controller 185 is allowed to perform a DB build for the multimedia contents stored in the first memory 160.

Figure 4:
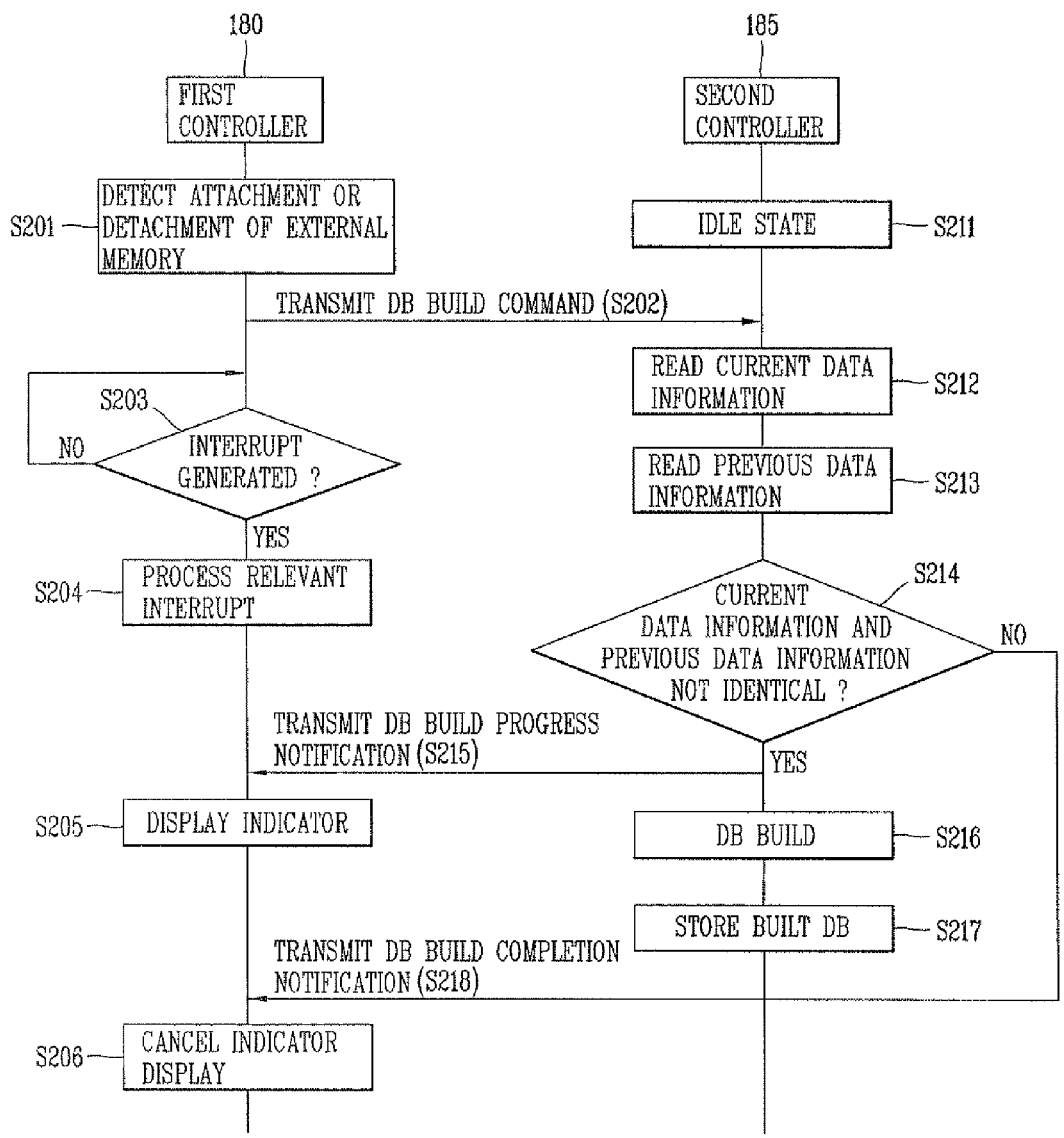
FIG. 4 is a flowchart illustrating a method of controlling a mobile terminal according to another embodiment of the present invention.

Referring to FIG. 4, a process control method in a mobile terminal 100 according to another embodiment of the present invention is described. When an external memory, such as memory card, is mounted on the first and the second interface units 170, 175 of the mobile terminal 100, the first controller 180 detects the mounting of the external memory through the sensing unit 140 (S201). For example, upon detecting mounting of the memory card, the first controller 180 recognizes that data files stored in the memory card have been changed and determines that a DB build for the data stored in the memory card is required. In other words, the first controller 180 recognizes that the database for multimedia contents stored within the mobile terminal 100 needs to be updated.

When the mounting of the external memory is detected, the first controller 180 transmits a control command to the second controller 185 that is in an idle state (S211), instructing the second controller 185 to perform a DB build (S202). At this time, the first controller 180 also instructs the second controller 185 to process the DB build in the background.

The second controller 185 receives a control command from the first controller 180 requesting the second controller 185 to perform the DB build based on the change of multimedia contents stored within the mobile terminal 100. The second controller 185 reads multimedia contents currently stored in the first and/or second memories 160, 165 and the external memory in response to the received control command (S212). In other words, the second controller 185 enumerates a list of multimedia contents currently stored in the first and second memories 160, 165 and the external memory to display it on a display screen.

Then, the second controller 185 reads previous DB information or previous data information stored in the first memory 160 (S213). In other words, the second controller 185 reads a catalogue of multimedia contents that have been previously stored in the first and/or second memories 160, 165 and the external memory.

Upon reading the current data information and previous data information, the second controller 185 compares them to each other (S214). The second controller 185 checks whether the current catalogue of multimedia contents stored in the first and/or second memories 160, 165 and the external memory are identical to the previous catalogue.

If the current data information and the previous date information are not identical according to the result of the comparison, then the second controller 185 transmits a notification signal, notifying a DB build progress, to the first controller 180 (S215). The first controller 180 receiving the notification signal displays an indicator indicating that the DB build is being processed in the background (S205).

Then, the second controller 185 generates DB information for the multimedia contents currently stored in the first and/or second memories 160, 165 and the external memory (S216). In other words, the second controller 185 generates a list of multimedia contents currently stored in the mobile terminal 100.

If the DB build is completed, then the second controller 185 stores the generated DB information in the first memory 160 via the first controller 180 (S217). For example, the second controller 185 transmits the generated DB information to the first controller 180 and the first controller 180 updates the previous DB information stored in the first memory 160 according to the newly generated DB information provided from the second controller 185.

After storing the generated DB information, the second controller 185 transmits a notification, notifying that the DB information generation has been completed, to the first controller 180 (S218). The first controller 180, upon receiving the notification, stops displaying the indicator on the display screen (S206).

If an interrupt is generated while the DB build is processed by the second controller 185 in the background, then the first controller 180 detects the generated interrupt and processes the interrupt (S203, S204). For example, when a call signal is received through the wireless communication unit 110 while the second controller 185 generates DB information in the background, the first controller 180 processes the received call signal in response to a user's command. In other words, if the command is for a call connection, then the first controller 180 connects to a calling terminal.

Figure 5:
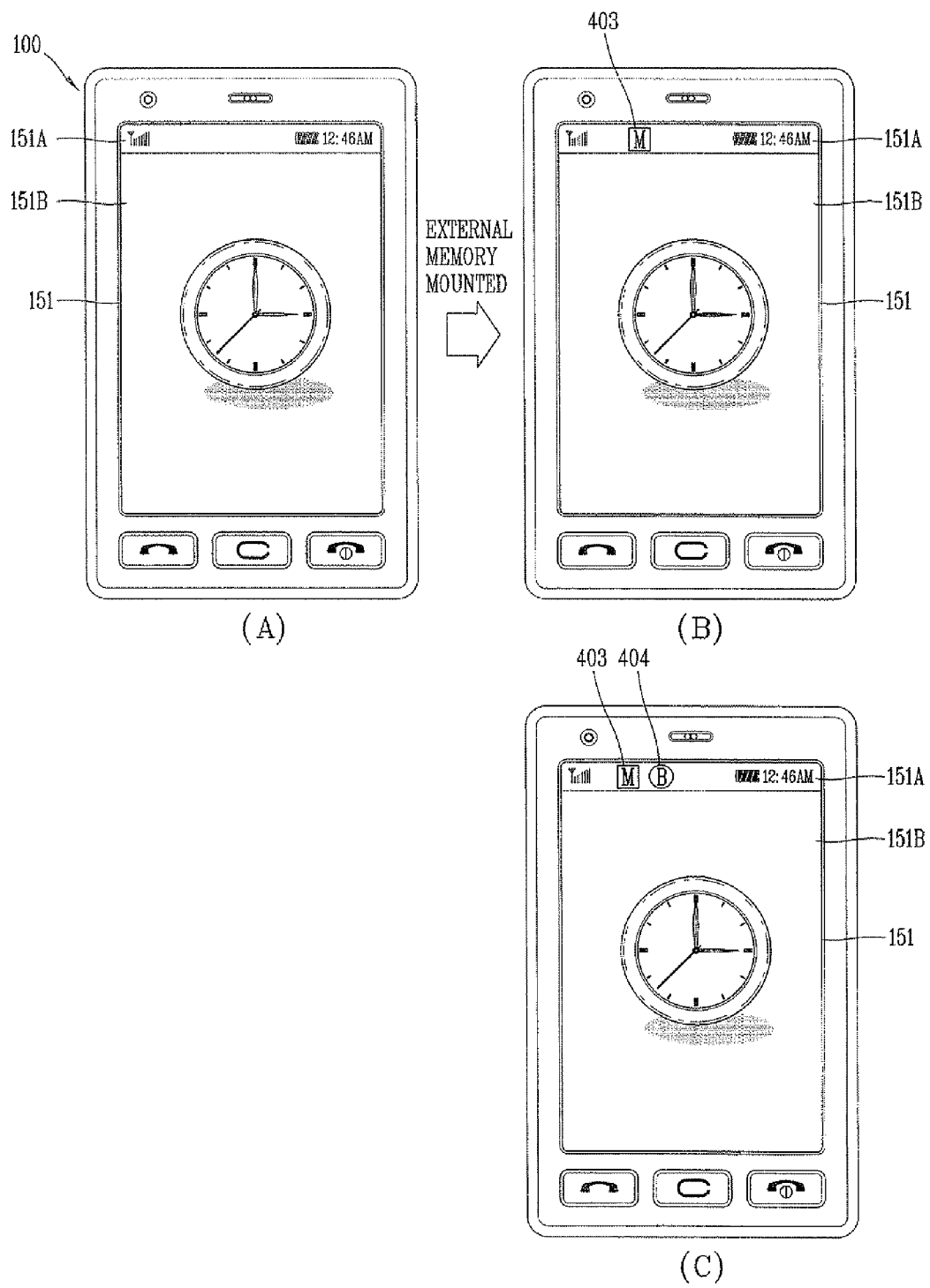
FIG. 5(A)-5(C) show a display screen of a mobile terminal according to another embodiment of the present invention on which a background process is indicated.

Referring to FIGS. 5(A)-5(C), an exemplary process control screen on a mobile terminal 100 according to another embodiment of the present invention is described. When an external memory is mounted on the second interface unit 175 of the mobile terminal 100 in a standby status, the first controller 180 detects connection of the external memory via a sensing unit 140 as shown in FIG. 5A. Alternatively, when the external memory is mounted on the second interface unit 175, the second controller 185 may detect the connection of the external memory and notify the first controller 180 of the connection.

Upon detecting the connection of the external memory, the first controller 180 displays an indicator 403 indicating the mounting of the external memory on the status display region 151A as shown in FIG. 5B. The first controller 180, upon recognizing that data stored within the mobile terminal 100 has been changed, determines to update the database or perform a database build.

Furthermore, upon detecting the mounting of the external memory, the first controller 180 checks whether the second controller 185 is in an idle state, and upon determining that the second controller 185 is in the idle state, the first controller 180 instructs a DB build of the multimedia contents stored in the mounted external memory. The second controller 185 reads current directory information of the second memory 165 in response to the command received from the first controller 180 and compares the current directory information with previously generated DB information. If current directory information and previous DB information are not identical, then the second controller 185 processes the DB build of the multimedia contents stored in the second memory 165 in the background. Further, the first controller 180 displays an indicator 404, indicating that the DB build is being processed in the background, on the status display region 151A as shown in FIG. 5C. The first controller 180 may change the color, shape, or the like of the indicator 404 based on the progress of the DB build.

Figure 6:
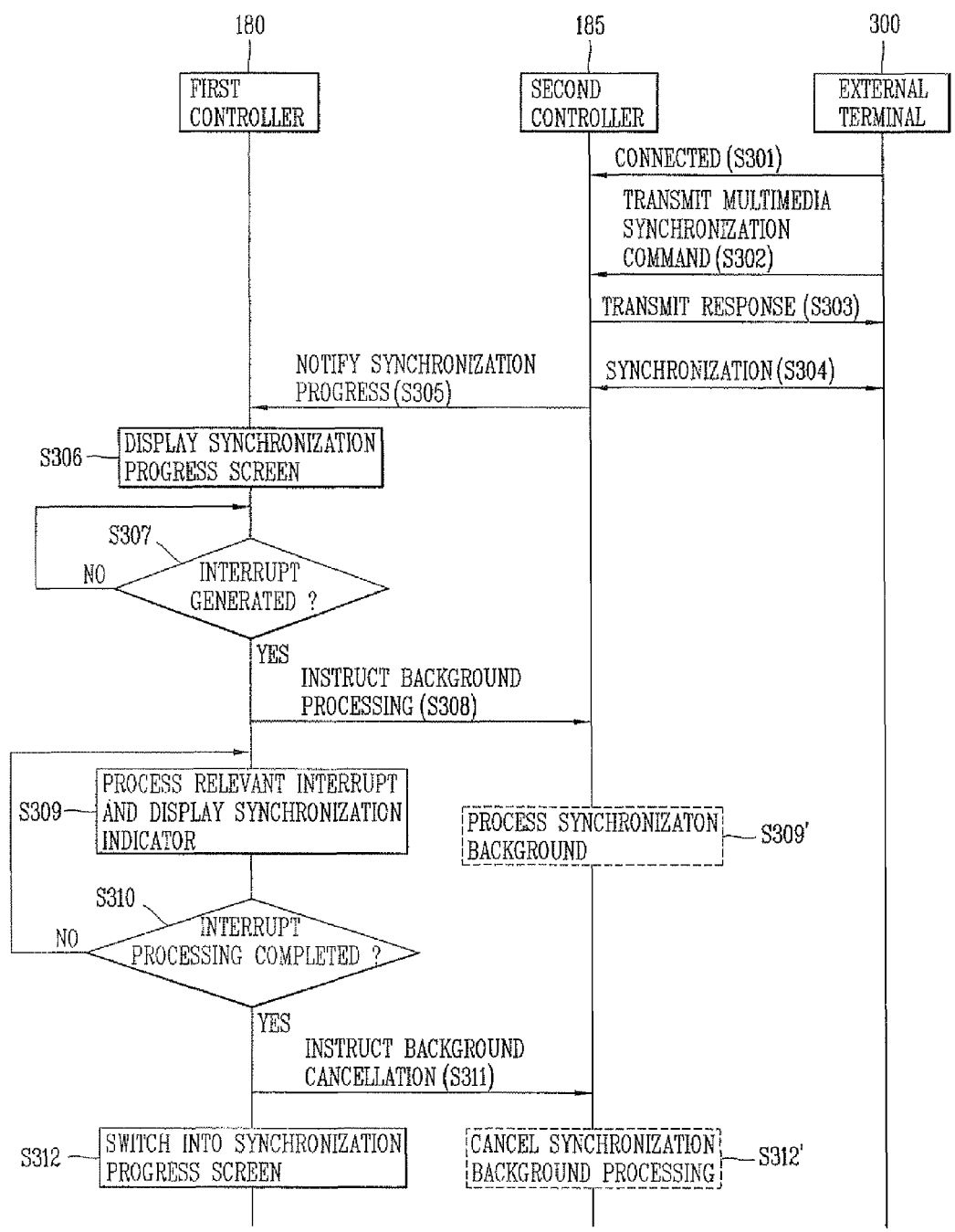
FIG. 6 is a flowchart illustrating a method of controlling a mobile terminal according to still another embodiment of the present invention.

Referring to FIG. 6, a process control method of a mobile terminal 100 according to still another embodiment of the present invention is described. The mobile terminal 100, having the first controller 180 and the second controller 185, establishes connection to an external terminal 300 (S301). The mobile terminal 100 and the external terminal 300 may be connected to each other via a wired/wireless communication network. For example, the mobile terminal 100 and the external terminal 300 may be connected to each other via a communication means such as USB communication, Bluetooth, Wi-Fi, or the like. Furthermore, the mobile terminal 100 and the external terminal 300 can exchange media files and their related meta data with each other through a protocol such as media transfer protocol (MTP).

The external terminal 300 transmits a multimedia synchronization command to the second controller 185 when the connection to the second controller 185 has been completed (S302). In other words, the external terminal 300 requests multimedia contents synchronization with the mobile terminal 100 in order to transmit multimedia contents that are stored within the external terminal 300, but are not stored within the mobile terminal 100.

The second controller 185, upon receiving the synchronization command, transmits a response to the synchronization command to the external terminal 300 (S303). The external terminal 300 and the mobile terminal 100 perform synchronization for exchanging media files and their metadata between them (S304).

Then, the second controller 185 notifies the first controller 180 that the synchronization is being processed (S305). The first controller 180 displays a synchronization progress screen, notifying that the synchronization is being processed, on the display unit 151 (S306).

If an interrupt is generated while the synchronization is processed, then the first controller 180 detects the interrupt and instructs the second controller 185 to continue the background processing of the synchronization (S308). The first controller 180 checks whether multimedia contents are used by the interrupt and then immediately instructs the second controller 185 to continue the synchronization in the background if the multimedia contents are not used by the interrupt. Alternatively, if the multimedia contents are used by the interrupt, then the first controller 180 requests the second controller 185 to adjust processing of the multimedia contents, wherein the second controller 185 adjusts a task priority, thus processing the synchronization of the relevant multimedia contents at a lower speed. Accordingly, the second controller 185 processes the synchronization in the background under the control of the first controller 180 (S309').

While the synchronization is processed in the background, the first controller 180 processes the generated interrupt and displays an indicator, notifying that the synchronization is being processed, on the interrupt processing screen (S309). The first controller 180 switches the synchronization progress screen into an interrupt processing screen in response to the interrupt. For example, if a message is received while the synchronization is being processed, then the first controller 180 switches from the synchronization progress screen into an execution screen for the message function for checking a received message.

When processing of the generated interrupt is completed, the first controller 180 transmits the background processing cancellation command to the second controller 185 (S311). In response to the background processing cancellation command, the second controller 185 cancels the background processing of the synchronization (S312').

Subsequently, the first controller 180 switches into a synchronization progress screen from the interrupt processing screen when the background processing is canceled (S312). For example, if the background synchronization processing is canceled, the first controller 180 transmits a control command for foreground processing of the synchronization operation to the second controller 185. Upon receiving the foreground processing command, the second controller 185 switches the synchronization operation from the background processing to the foreground processing. Then, the second controller 185 notifies the first controller 180 that the synchronization operation is being performed as foreground processing. If the second controller 185 notifies the first controller 180 that the synchronization operation is being processed as the foreground processing, then first controller 180 switches into a synchronization progress screen from the interrupt processing screen.

In the foregoing embodiment, if media processing is requested from the first controller 180 while the synchronization is processed by the second controller 185, then a conflict is generated for the operation of the second controller 185. In order to prevent such conflict, a task priority needs to be adjusted according to the foregoing embodiment. In addition to the adjustment of the task priority, it may be implemented such that the use of multimedia contents is not limited by sharing a storage medium in which media files are stored. For example, if multimedia contents are used for a ring tone when a call signal is received, the first controller 180 does not request the second controller 185 to process the multimedia contents used for the ring tone, but directly accesses the multimedia contents stored in the shared memory. Accordingly, a process control of the second controller 185 is not interrupted.

Figure 7:
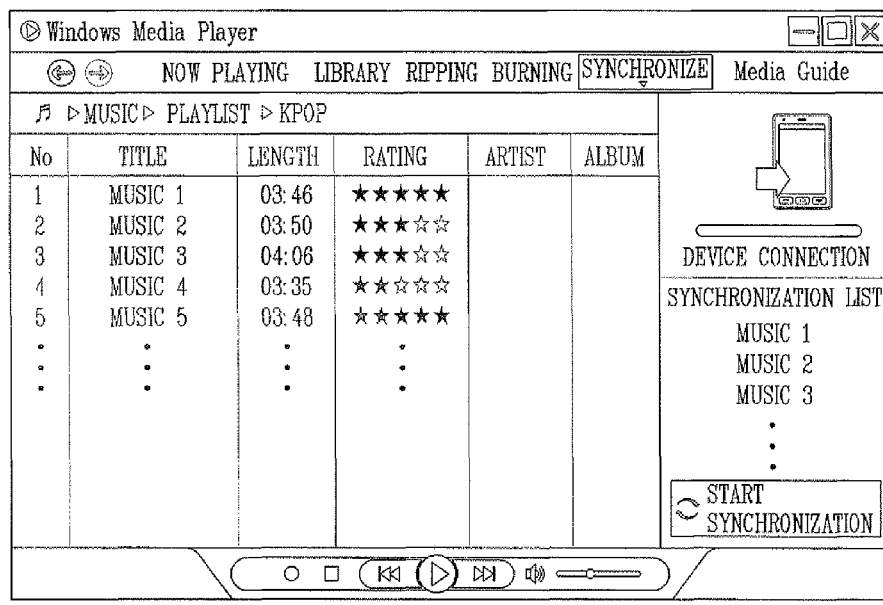
FIGS. 7 and 8 illustrate processing an interrupt generated while a mobile terminal according to an embodiment of the present invention is synchronized with an external terminal.
Figure 8:
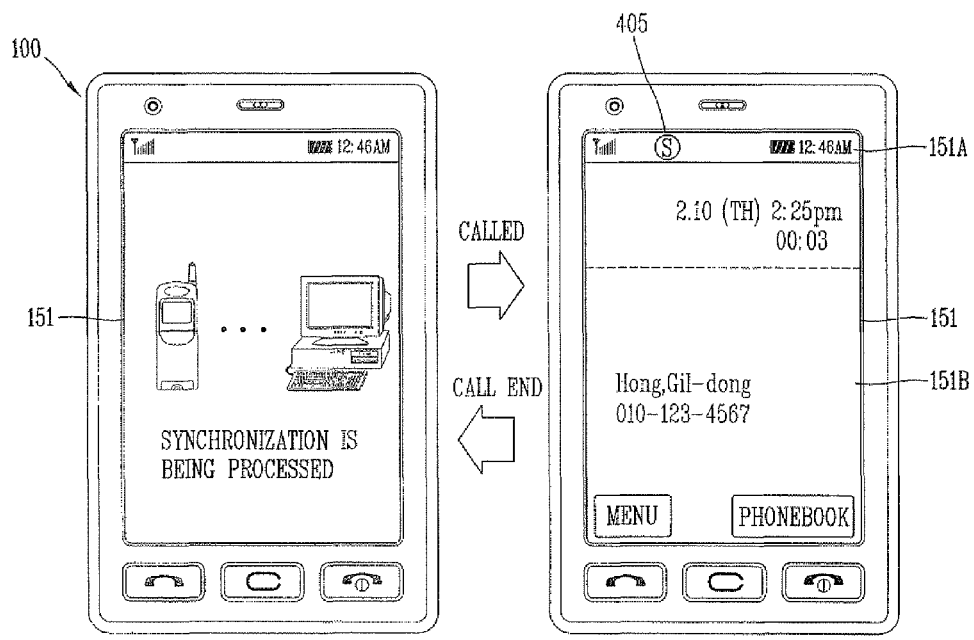

Referring to FIGS. 7 and 8, processing of an interrupt generated while a mobile terminal 100 is synchronized with an external terminal is described. When a user connects a mobile terminal 100 to a computer and executes a media player application in the computer, the computer displays a screen for the executed media player application on a display monitor as illustrated in FIG. 7. Then, the user selects a list of multimedia contents to be synchronized with the mobile terminal 100 on the media player application screen and selects a "SYNCHRONIZE" icon.

When the "SYNCHRONIZE" icon is selected, the computer compares a synchronization list with a multimedia contents list stored in the mobile terminal 100 and transmits multimedia contents of the synchronization list that do not exist in the multimedia contents list. For example, if MUSIC 1 and MUSIC 3 do not exist within the mobile terminal 100, then the computer transmits MUSIC 1 and MUSIC 3 to the mobile terminal 100 through the media player application.

The mobile terminal 100 displays a synchronization progress screen indicating that the synchronization is being processed on the display unit 151 as illustrated in FIG. 8. If an incoming call signal is received through the wireless communication unit 110 while the synchronization is processed, then the first controller 180 instructs the second controller 185 to process the synchronization in the background, and processes the received incoming call signal in the foreground. For example, the first controller 180 processes an incoming call to perform a phone conversation and displays information such as caller information, talk time, and the like on the information display region 151B and displays an indicator 405, indicating that the synchronization is being processed, on the status display region 151A. In other words, if an incoming call is received, then the first controller 180 switches from a synchronization screen to a receiving call screen and a synchronization operation is processed by the second controller 185. Then, the first controller 180 outputs an incoming call sound or vibration. If the incoming call signal is accepted by the user, then the first controller 180 performs a phone conversation with a counterpart via the wireless communication unit 110.

When the phone conversation is completed, the first controller 180 switches from a phone conversation screen into the synchronization progress screen and transmits a background processing cancellation command to the second controller 185. In other words, while the second controller 185 processes the synchronization operation in the background during the phone conversation, if the phone conversation is completed, then the first controller 180 instructs the second controller 185 to process the synchronization in the foreground and the second controller 185 continues the synchronization operation in the foreground.

According to the present disclosure, if a DB build is required in a mobile terminal, then the DB build is executed in the background using a processor that is in an idle state among a plurality of processors. Therefore, when a function requiring a DB build is selected, the selected function may be immediately executed without additionally performing the DB build. As a result, when a DB build is required to perform a particular function, the user may immediately use the relevant function without a delay since the DB build is already complete.

Further, according to the present disclosure, if an interrupt is generated while an operation requiring a long period of processing, such as synchronization of a large amount of data, is processed, the operation will be continuously processed by one processor in the background and the generated interrupt can be processed by another processor.

The foregoing method may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented via a carrier wave, for example, a transmission via the Internet. The computer may include the controller 180 of the mobile terminal 100.

The configurations and methods according to the above-described embodiments will not be applicable in a limited way to the foregoing terminal, and all or part of each embodiment may be selectively combined and configured to make various modifications thereto.

What is claimed is:
1. A method of controlling processing in a mobile terminal comprising a plurality of controllers, the method comprising:
   connecting with an external terminal;
   synchronizing data stored in the external terminal with data previously stored within the mobile terminal in response to a synchronization request received from the external terminal, wherein the synchronization is performed by a second controller of the mobile terminal, the second controller notifying a first controller of the mobile terminal about the synchronization performed;

continuing, by the second controller, the synchronization when a call signal is received during the synchronization; and processing, by the first controller, the received call signal while the synchronization is processed by the second controller as a background process.

2. The method of claim 1, further comprising:

determining, by the first controller, whether the second controller is in an idle state upon receiving the call signal; and sending, from the first controller, a command signal to the second controller upon determining that the second controller is in the idle state, the command signal instructing the second controller to perform the synchronization as the background process.

3. The method of claim 1, further comprising:

determining, by the first controller, whether the data is necessary for processing the received call signal;

sending, from the first controller, a command signal to the second controller upon determining that the data is necessary for processing the received call signal, the command signal instructing the second controller to adjust a task priority in consideration of the data necessary for processing the received call signal; and adjusting, by the first controller, the task priority and processing the received call signal based on the command signal.

4. The method of claim 3, wherein the data comprises multimedia contents and the data is used for a ringtone in response to the received call signal.

5. The method of claim 1, further comprising:

displaying a synchronization screen, notifying a progress of the synchronization, on a display of the mobile terminal; and displaying an indicator on a portion of the display while the received call is processed by the first controller, the indicator indicating that the synchronization is being processed as the background process.

6. The method of claim 5, further comprising:

displaying information related to the processing of the call signal on the display while the received call is processed by the first controller.

7. The method of claim 5, further comprising:

checking, by the first controller, whether the synchronization is being performed by the second controller upon completing the processing of the received call signal;

continuing, by the second controller, the synchronization as a foreground process when the processing of the received call signal is completed; and re-displaying the synchronization screen on the display while the synchronization is continued as the foreground process.

8. A mobile terminal, comprising:

a first controller configured to control an overall operation of the mobile terminal;

a memory configured to store data comprising first data;

an interface configured to connect with an external terminal;

a second controller configured to perform synchronization between the first data previously stored in the memory and second data stored in the external terminal in response to a synchronization request received from the external terminal; and a wireless communication unit configured to receive a call signal, wherein the second controller is further configured to perform the synchronization as a background process and the first controller is further configured to process the call signal upon receiving the call signal while the synchronization is performed as the background process.

9. The mobile terminal of claim 8, wherein the first controller is further configured to determine whether the second controller is in an idle state upon receiving the call signal, the first controller sending a command signal to the second controller upon determining that the second controller is in the idle state, wherein the command signal instructs the second processor to perform the synchronization as the background process.

10. The mobile terminal of claim 8, wherein the first controller is further configured to determine whether the first data is necessary for processing the received call signal, the first controller sending a command signal to the second controller upon determining that the first data is necessary for processing the received call signal, the command signal instructing the second controller to adjust a task priority in consideration of the first data necessary for processing the received call signal, and the second controller is further configured to adjust the task priority and process the received call signal based on the command signal.

11. The mobile terminal of claim 10, wherein the first data and the second data comprise multimedia contents and at least the first data or the second data is used as a ringtone in response to the received call signal.

12. The mobile terminal of claim 10, wherein the first controller is further configured to display a synchronization screen notifying a progress of the synchronization on a display of the mobile terminal, and to display an indicator on a portion of the display while the received call is processed by the first controller, the indicator indicating that the synchronization is being processed as the background process.

13. The mobile terminal of claim 12, wherein the first controller is further configured to display information related to processing the call signal on the display while the received call is processed by the first controller.

14. The mobile terminal of claim 12, wherein the first controller is further configured to check whether the synchronization is being processed by the second controller upon completing the processing of the received call signal, the second controller continuing the synchronization as a foreground process when the processing of the received call signal is completed, and the first controller is further configured to re-display the synchronization screen on the display while the synchronization is continued as the foreground process.

15. A method of controlling processing in a mobile terminal comprising a plurality of controllers, the method comprising:

processing a database (DB) build with data stored in a storage medium for a particular application to be performed in the mobile terminal;

receiving a call signal while the DB build is processed;

continuing processing of the DB build as a background process upon receiving the call signal; and processing the received call signal while the DB build is processed as the background process.

16. The method of claim 15, wherein the plurality of controllers comprises a first controller processing the received call and a second controller processing the DB build.

17. The method of claim 16, wherein continuing the processing of the DB build as the background process comprises:

comparing, by the second controller, current data information currently stored in the storage medium with previous data information in a database; and building an updated database with the current data information upon determining that the current data information is not identical to the previous data information.

18. The method of claim 17, wherein the current data information comprises meta information of at least one or more media contents currently stored in the storage medium.

19. The method of claim 16, further comprising:
determining, by the first controller, whether the data is necessary for processing the received call signal;
sending, from the first controller, a command signal to the second controller upon determining that the data is required for processing the received call signal, the command signal instructing the second controller to adjust a task priority in consideration of the data necessary for processing the received call signal; and
adjusting, by the second controller, the task priority and processing the received call signal based on the command signal.

20. The method of claim 19, wherein the data comprises multimedia contents and the data is used for a ringtone in response to the received call signal.

21. A mobile terminal, comprising:
a first controller configured to control an overall operation of the mobile terminal;
a second controller configured to process first data used in a particular application under a control of the first controller, the second controller processing a database (DB) build used for the particular application;
a memory configured to store data comprising the first data; and
a wireless communication unit configured to receive a call signal,
wherein the second controller is further configured to continue the processing of the DB build with the first data stored in the memory as a background process and the first controller is further configured to process the call signal upon receiving the call signal while the DB build is processed as the background process.

22. The mobile terminal of claim 21, further comprising a display and wherein the first controller is further configured to display an indicator, indicating that the DB build is being processed as the background process, on the display.

23. The mobile terminal of claim 21, wherein the first controller controls the second controller to process the DB build with second data stored in an external memory in addition to the first data stored in the memory upon detecting connection of the external memory to the mobile terminal.

24. The mobile terminal of claim 21, wherein the second controller is further configured to compare current data information currently stored in the memory with previous data information in a database and to build an updated database with the current data information upon determining that the current data information is not identical to the previous data information.

25. The mobile terminal of claim 24, wherein the current data information comprises meta information of at least one or more media contents currently stored in the memory.

26. The mobile terminal of claim 21, wherein the first controller is further configured to determine whether the first data is necessary for processing the received call signal, the first controller sending a command signal to the second controller upon determining that the first data is necessary for processing the received call signal, the command signal instructing the second controller to adjust a task priority in consideration of the first data necessary for processing the received call signal, and the second controller is further configured to adjust the task priority and process the received call signal based on the command signal.

27. The mobile terminal of claim 26, wherein the first data comprises multimedia contents and the first data is used for a ringtone in response to the received call signal.

* * * * *